(12) United States Patent
Lippey et al.

(10) Patent No.: US 7,241,014 B2
(45) Date of Patent: Jul. 10, 2007

(54) MICRODISPLAY PROJECTION

(75) Inventors: Barret Lippey, Belmont, MA (US); Stephen R. O'Dea, Wilmington, MA (US); James F. Shanley, Westboro, MA (US); Michael O'Connell, Northborough, MA (US)

(73) Assignee: Bose Corporation, Framingham, MA (US)

( * ) Notice: Subject to any disclaimer, the term of this patent is extended or adjusted under 35 U.S.C. 154(b) by 102 days.

(21) Appl. No.: 11/002,613

(22) Filed: Dec. 2, 2004

(65) Prior Publication Data

US 2006/0119795 A1    Jun. 8, 2006

(51) Int. Cl.
  *G02B 27/22*    (2006.01)
(52) U.S. Cl. ............... 353/8; 353/20; 349/15; 349/9; 359/465
(58) Field of Classification Search ............ 353/7, 353/8, 20, 31, 33, 34, 37; 349/5, 6, 7, 8, 349/9, 15; 348/742, 743, 771; 359/464, 359/465, 462
See application file for complete search history.

(56) References Cited

U.S. PATENT DOCUMENTS

| 5,028,121 | A |   | 7/1991  | Baur et al. |         |
|-----------|---|---|---------|-------------|---------|
| 5,042,921 | A | * | 8/1991  | Sato et al. ........................ | 349/9 |
| 5,074,645 | A |   | 12/1991 | Gold et al. |         |
| 5,347,644 | A |   | 9/1994  | Sedlmayr    |         |
| 5,552,840 | A | * | 9/1996  | Ishii et al. .................. | 348/751 |
| 5,575,548 | A |   | 11/1996 | Lee         |         |
| 5,982,538 | A |   | 11/1999 | Shikama et al. |      |
| 6,276,801 | B1| * | 8/2001  | Fielding ....................... | 353/31 |
| 6,280,034 | B1| * | 8/2001  | Brennesholtz ............... | 353/20 |
| 6,309,071 | B1| * | 10/2001 | Huang et al. ................. | 353/31 |
| 6,624,935 | B2|   | 9/2003  | Weissman et al. |    |
| 6,650,377 | B2| * | 11/2003 | Robinson et al. .............. | 349/9 |
| 6,672,722 | B2| * | 1/2004  | O'Connor et al. ............ | 353/34 |
| 6,793,341 | B2|   | 9/2004  | Svardal et al. |      |
| 6,945,654 | B2| * | 9/2005  | Newell et al. ................ | 353/81 |
| 6,972,810 | B2| * | 12/2005 | Magarill et al. ............... | 349/8 |
| 2001/0028416 | A1 | | 10/2001 | Divelbliss et al. |  |
| 2002/0154404 | A1 | | 10/2002 | Sedlmayr    |         |
| 2003/0020809 | A1 | | 1/2003  | Gibbon et al. |       |

FOREIGN PATENT DOCUMENTS

| JP | 11-281931       | 10/1999 |
| WO | WO 02/32149 A2  | 4/2002  |
| WO | WO 02/076107 A1 | 9/2002  |

* cited by examiner

*Primary Examiner*—William C. Dowling
(74) *Attorney, Agent, or Firm*—Fish & Richardson P.C.

(57) ABSTRACT

Methods and apparatus for forming two orthogonally polarized beams of light from an unpolarized beam of light using one of at least two different image modes, the forming includes a color filtering process that is based on the image mode being used, and projecting the two orthogonally polarized beams to form an image on a viewing surface. Methods and apparatus for separating an unpolarized light beam into four beams as a function of wavelength and polarization; selectively modulating the four beams respectively using four light valves; and combining the four modulated beams to generate two orthogonally polarized light beams.

30 Claims, 10 Drawing Sheets

MICRODISPLAY PROJECTION

TECHNICAL FIELD

This disclosure relates to microdisplay projection.

BACKGROUND

Microdisplay projectors are used in two-dimensional (2D) projection display systems such as rear-projection televisions, portable business projectors, fixed installation or conference room projectors, and large venue digital cinema projectors. Microdisplays are also used in three-dimensional (3D) projection display systems such as the VR-3100 Stereoscopic Projector available from VRex, Inc.

Microdisplay projectors fall into two general categories, front projectors and rear projectors. Front projectors illuminate a screen that reflects light into the viewer's eyes. Rear projectors illuminate a transparent screen to display an image that is viewed from the side of the screen that is opposite the projector.

A key element of a microdisplay projector is a light engine, which is a compact optical system that typically includes a white light lamp, one or more microdisplays, various optical elements, and a projection lens.

3D image projectors use two light engines, one light engine to project one state of polarization and the other to project an orthogonal state of projection. The two light engines are aligned to achieve a specific image convergence on an image-viewing screen.

SUMMARY

In general, in one aspect, the invention features a method including forming two orthogonally polarized beams of light from an unpolarized beam of light using one of at least two different image modes, the forming including a color filtering process that is based on the image mode being used, and projecting the two orthogonally polarized beams to form an image on a viewing surface.

Implementations may include one or more of the following features. The image modes include a two-dimensional image forming mode and a three-dimensional image forming mode. The unpolarized light beam is processed to emphasize light of a first set of wavelengths when a first image mode is being used. The first set of wavelengths comprises red light. The color filtering process increases color accuracy of the image on the viewing surface. The unpolarized light beam is processed to emphasize light of a second set of wavelengths when a second image mode is being used. The second set of wavelengths comprises blue light and green light. The color filtering process increases brightness of the image on the viewing surface.

In general, in another aspect, the invention features an apparatus including a light processor to receive a beam of unpolarized of light and to form two orthogonally polarized beams of light from the unpolarized beam using one of at least two different image modes, the forming including a color filtering process that is based on the image mode being used, and a lens to project the two orthogonally polarized beams to form an image on a viewing surface.

Implementations may include one or more of the following features. The image modes include a two-dimensional image forming mode and a three-dimensional image forming mode. The light processor includes a filtering optical element to process the unpolarized beam to emphasize light of a first set of wavelengths when a first image mode is being used. The first set of wavelengths comprises red light. The light processor includes a filtering optical element to process the unpolarized beam to emphasize light of a second set of wavelengths when a second image mode is being used. The second set of wavelengths comprises blue light and green light. The filtering optical element includes a color filter wheel. The color filter wheel may be a red-green-blue color wheel, a cyan-magenta-yellow color wheel, or a color wheel having a plurality of segments, each segment including a dichroic filter and a rotator. The filtering optical element includes a color switch.

The light processor includes a spectrally-selective optical element to reflect the unpolarized beam of a first set of wavelengths and to transmit the unpolarized beam of a second set of wavelengths. The spectrally-selective optical element includes a dichroic beamsplitter. The light processor includes a polarization-selective optical element to separate the unpolarized beam into beams as a function of polarization. The polarization-selective optical element includes a polarizing beamsplitter. The light processor includes at least one light valve to modulate a beam polarized in a first direction; and at least one light valve to modulate a beam polarized in a second direction. Each light valve modulates a polarized beam in response to a video signal. The light processor includes a liquid crystal on silicon (LCOS) light valve, a liquid crystal on silicon on sapphire (LCOSOS) light valve, or a digital micromirror device (DMD) light valve. The light processor includes an optical element comprising a polarization rotator with a dichroic coating, the polygon-shaped optical element to separate the unpolarized beam into beams as a function of wavelength and polarization. The optical element may be polygon-shaped or cylindrical-shaped.

In general, in one aspect, the invention features a method including separating an unpolarized light beam into four beams as a function of wavelength and polarization; selectively modulating the four beams respectively using four light valves; and combining the four modulated beams to generate two orthogonally polarized light beams.

Implementations may include one or more of the following features. Two of the four beams comprise long wavelength light beams; and the other two of the four beams comprise short to medium wavelength light beams. Two of the four beams comprise red light; and the other two of the four beams comprise blue light and green light. The four beams are selectively modulated in response to a video signal.

In general, in another aspect, the invention features an apparatus including a light processor to receive a beam of unpolarized light and to separate the unpolarized beam into four beams as a function of wavelength and polarization, selectively modulate the four beams respectively using four light valves, and combine the four modulated beams to generate two orthogonally polarized light beams; and a lens to project the two orthogonally polarized beams to form an image on a viewing surface.

Implementations may include one or more of the following. Two of the four beams include long wavelength light beams, and the other two of the four beams include short to medium wavelength light beams. Two of the four beams include red light, and the other two of the four beams include blue light and green light. The light processor selectively modulates the four beams in response to a video signal. The light processor may include one or more of transmissive light valves. The light processor may include one or more reflective light valves.

In general, in one aspect, the invention features a method including forming two orthogonally polarized beams of light from an unpolarized beam of light using a two-dimensional image forming mode or a three-dimensional image forming mode, the forming including a color filtering process that emphasizes red light when the two-dimensional image forming mode is used and emphasizes blue light and green light when the three-dimensional image forming mode is used; and projecting the two orthogonally polarized beams to form an image on a viewing surface.

In general, in another aspect, the invention features an image projector including a light processor to receive an unpolarized beam of light and to form two orthogonally polarized beams of light from the unpolarized beam using a two-dimensional image forming mode or a three-dimensional image forming mode, the forming including a color filtering process that emphasizes red light when the two-dimensional image forming mode is used and emphasizes blue light and green light when the three-dimensional image forming mode is used; and a lens to project the two orthogonally polarized beams to form an image on a viewing surface.

Advantages that can be seen in particular implementations of the invention include one or more of the following. A compact projection system having a single light engine can be used to project 2D or 3D images. The alignment of the two images (for left and right eyes) is performed when the color management system is fabricated. This eliminates the need for adjustment of multiple light engines for 3D viewing. Furthermore, by including all of the hardware for projecting 3D images in a single light engine, the cost and size is significantly reduced as compared to a conventional 3D projection system having two light engines.

The light engine described in the specification can also be used for projecting 2D images and provides for a light efficient system that results in a high-brightness image.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
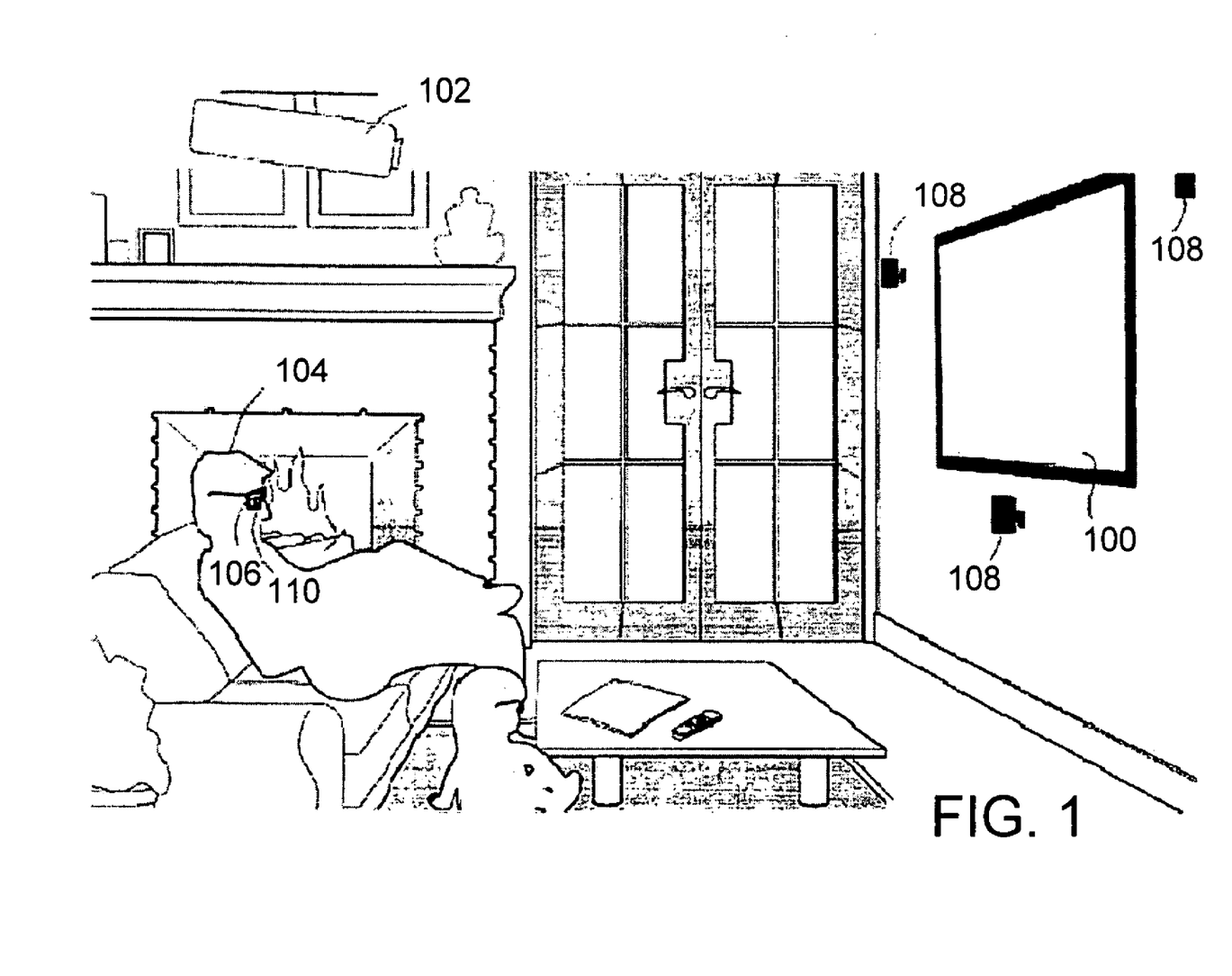
FIG. 1 shows a projection screen used in a room.

As shown in FIG. 1, a projection screen 100 is suitable for viewing 2D and 3D images (or video, which is a series of images). For 3D viewing, a light engine 102 projects images intended for the left eye using light polarized in a first direction (e.g., the polarization vector can be tilted 45 degrees counter-clockwise from the p-direction with respect to the plane of the floor shown in FIG. 1), and projects related images intended for the right eye using light polarized in a second direction (e.g., the polarization vector can be tilted 45 degrees clockwise from the p-direction with respect to the plane of the floor shown in FIG. 1). A viewer 104 sitting in front of the screen 100 wears glasses or goggles 106 having polarizing eyepieces 110 that allow the viewer's left and right eyes to see the images intended for the left and right eyes, respectively, and not see the images intended for the right and left eyes, respectively. A set of front speakers 108 and rear surround speakers (not shown) provide surround sound effects. The projection screen 100 has surface features that allow the screen to achieve both a wide viewing angle and accurate 3D images.

Figure 2:
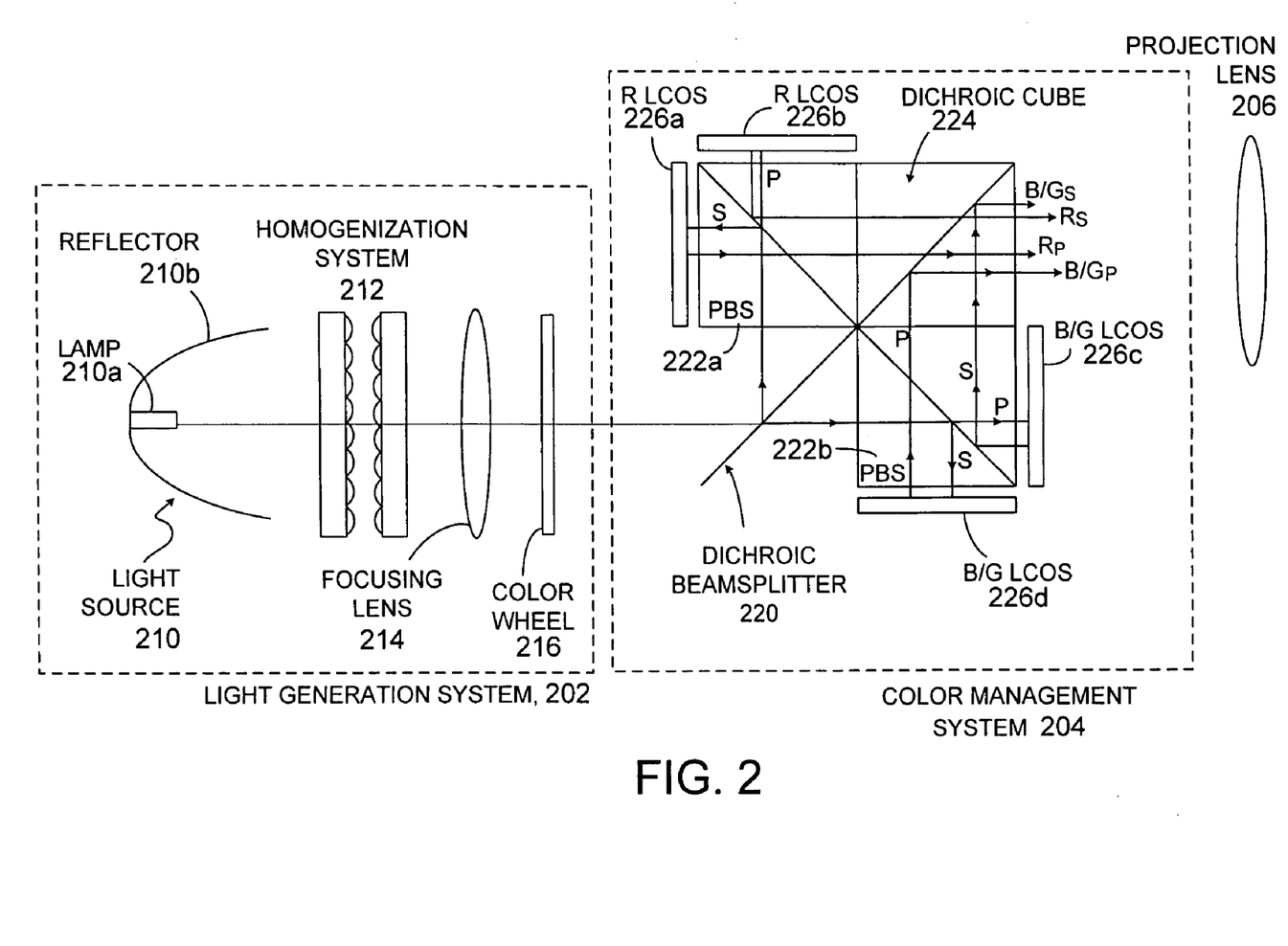
FIG. 2 shows an implementation of a light engine.

Referring to FIG. 2, a color filter wheel example of a light engine includes a light generation system 202, a color management system 204, and a projection lens 206. The light generation system 202 includes a light source 210, a homogenization system 212, a focusing lens 214, and a color wheel 216. The light source 210 includes a lamp 210a and a reflector 210b to gather and direct light rays to form a light beam. The lamp 210a can be any lamp used for microdisplay projectors such as metal halide lamps, ultra high pressure (UHP) lamps, Xenon lamps, or filament lamps. The reflector 210b can be an elliptical reflector that directs light rays to a focal point or a parabolic reflector that directs light rays in a collimated beam. In either case, a spatially non-uniform light beam is produced by the light source 210, and it is useful to use a homogenization system 212 to increase the spatial uniformity of the light beam emitted from the light source 210.

In the illustrated implementation, the homogenization system 212 is formed by a pair of conventional lenslet arrays (e.g., fly's eye lenses). A light beam from the homogenization system 212 is passed through the focusing lens 214, which focuses the light beam onto the appropriate portions of the color management system 204.

Figure 2A:
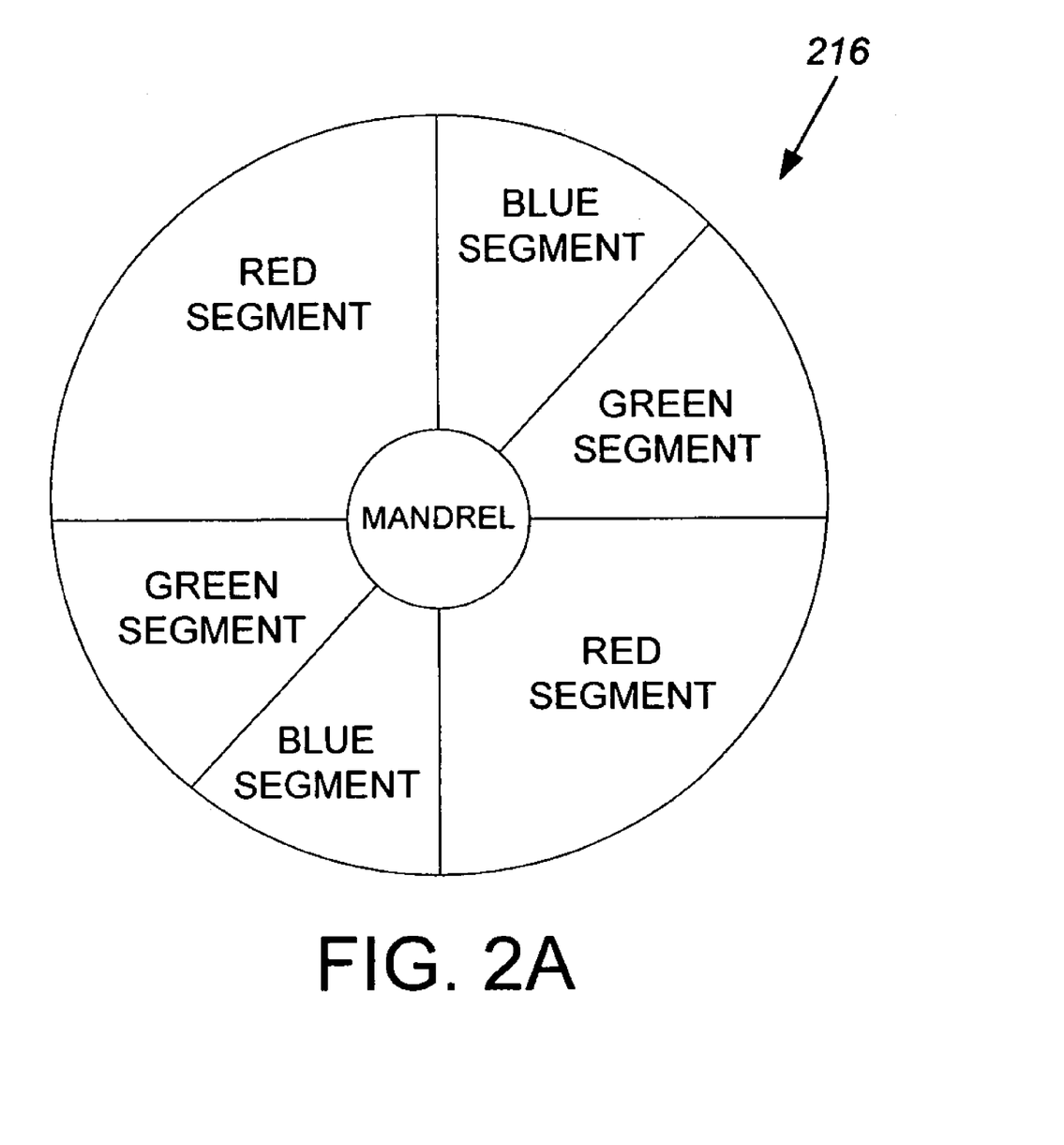
FIG. 2A shows a color wheel.

A color wheel 216 is disposed between the focusing lens 214 and the color management system 204. The color wheel 216 (cross-sectional view is shown in FIG. 2A) has multiple segments for passing light having certain wavelengths (e.g., light falling within the red, green, or blue bands of the visible light spectrum) to the color management system 204. As shown, the color wheel 216 is programmed to spin at a rate such that the red, green, and blue light beams are transmitted sequentially to the color management system 204. A system of electronics and software controls the spin so that it is synchronized with the light valves 226. If the lamp 210a is a UHP lamp, a yellow notch filter (not shown) may be disposed in the illumination path of the light generation system to compensate for the large yellow peak produced by the UHP lamp to avoid desaturating the green color.

The color management system 204 includes a flat dichroic beamsplitter 220, two polarizing beamsplitters 222a, 222b, a dichroic cube 224, and a light valve assembly including four light valves 226a-226d. The dichroic beamsplitter 220 is formed by depositing multilayer interference coatings on a flat substrate. The dichroic beamsplitter 220 is arranged at a 45-degree angle of incidence in the color management system 204, such that the light beams transmitted through the dichroic beamsplitter 220 and the light beams reflected by the dichroic beamsplitter 220 are at 90 degrees to each other. In the example of FIG. 2, red light beams are reflected by the dichroic beamsplitter 220 to a first polarizing beamsplitter 222a, and blue or green light beams are transmitted through the dichroic beamsplitter 220 to a second polarizing beamsplitter 222b. The polarizing beamsplitters 222a, 222b separate the light beams received from the dichroic beamsplitter 220 into their respective p-polarized and s-polarized components.

The light valves 226a-226d are implemented, in this example, as liquid crystal on silicon (LCOS) light valves. Two of the LCOS light valves ("red LCOS light valves") 226a, 226b modulate the red light beams that strike the light valves, and the other two ("blue/green LCOS light valves") 226c, 226d modulate both blue light beams and green light beams that strike the light valves. Each LCOS light valve 226a-226d consists of a layer of liquid crystals that is applied to a reflective mirror substrate and is configured to rotate polarization or not rotate polarization in response to an electrical video signal. As the liquid crystals are activated or not activated, each s-polarized or p-polarized light beam is either rotated or not rotated. The video signals sent to the LCOS light valves 226a-226d change based on the color being passed through the color wheel. For example, if a red pixel should be turned on, the electronics activate the pixel on a red LCOS light valve. By changing the video signals, each LCOS light valve 226-226d modulates the incident light beams on a pixel-by-pixel basis to generate the desired image.

For a light beam that is modulated by an "on" pixel of an LCOS light valve 226a-226d, the polarization of the light beam rotates by 90 degrees, such that a s-polarized light beam that strikes an LCOS light valve is reflected as a p-polarized light beam and a p-polarized light beam is reflected as a s-polarized light beam. The reflected light beams are transmitted to the dichroic cube 224 that is formed by depositing multilayer interference coatings on an internal diagonal face of the dichroic cube. The dichroic cube 224 is arranged in the color management system 204 such that the reflected light beams received from the red LCOS light valves 226a-226b and the blue/green LCOS light valves 226c-226d can be combined to form two orthogonally polarized images. In the case of linearly polarized light, one image is polarized in a first direction (e.g., the s-direction) and another image is polarized in a second direction (e.g., the p-direction), where the first and second directions are 90 degree apart. In the case of circularly polarized light, the two orthogonally polarized images have opposite polarization states (e.g., left hand and right hand).

The two orthogonally polarized images are then transmitted essentially simultaneously through the projection lens 206 to an image-viewing surface 100, such as a conventional projection screen or a polarization preserving projection screen. In this manner, a single light engine 102 can be used to project 3D images.

While the light engine 102 is shown as operating to project 3D images, it is enabled also to project 2D images without requiring a polarization recovery (or conversion) system. The light is polarized by polarizing beamsplitters 222a and 222b so no additional components are necessary. Elimination of the polarization recovery system enables the light engine 102 to enhance image brightness as polarization recovery generally results in a light loss equal to at least 20% of the incoming light.

Figure 3:
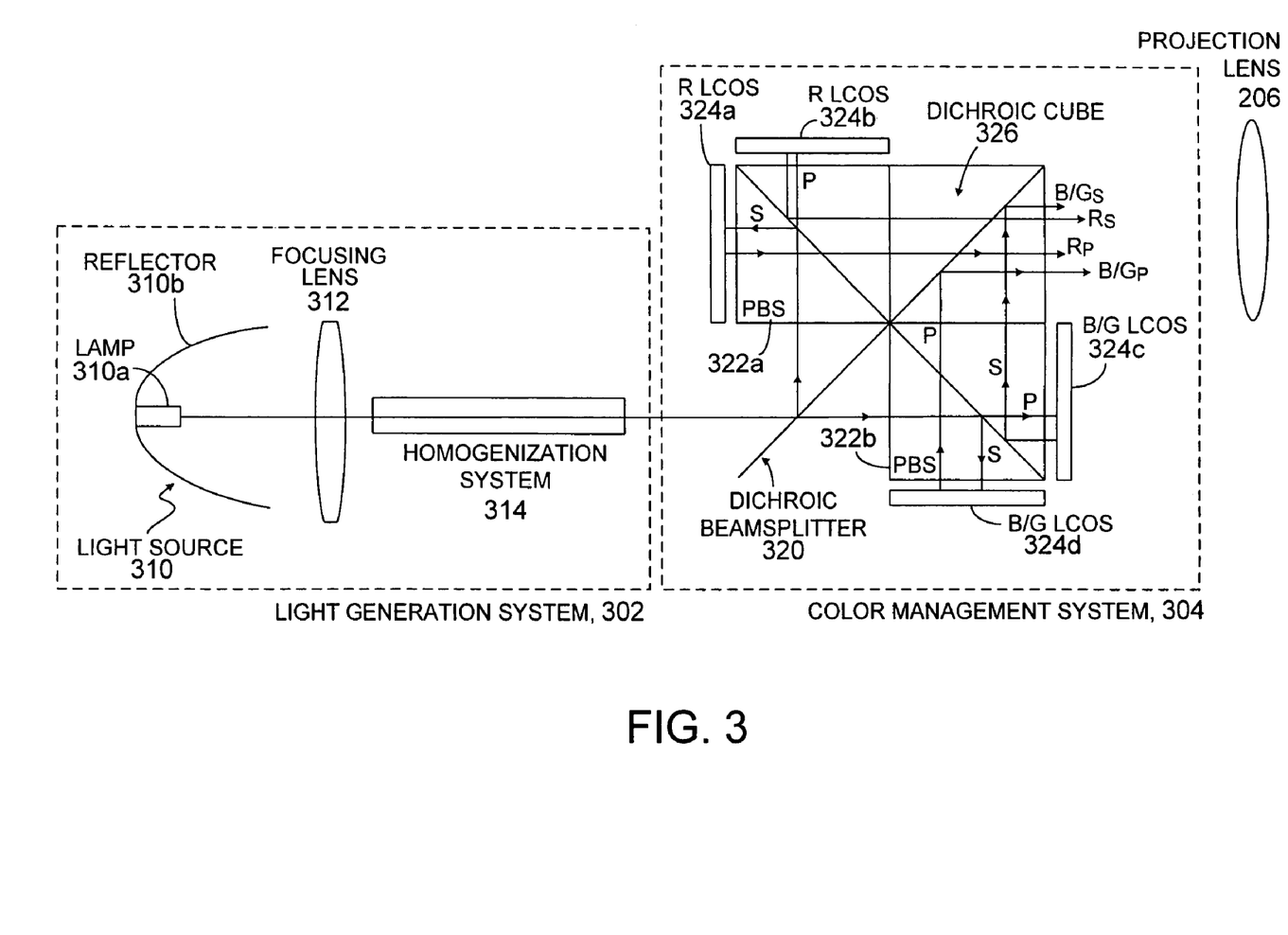
FIG. 3 shows an implementation of a light engine.

Referring to FIG. 3, in another implementation, the light engine 102 includes a light generation system 302 that includes a light source 310, a focusing lens 312, and a homogenization system 314. The light source 310 includes a lamp 310a and a reflector 310b for focusing a light beam from the lamp 310a onto the focusing lens 312. The focusing lens 312 focuses the light beam onto the homogenization system 314, which in this case is a lightpipe. In one example, the lightpipe is a solid rod formed from glass or some other transmitting material, with the transmitted light beam being homogenized via total internal reflection from the rod surfaces. In another example, the lightpipe is formed from a hollow reflective tunnel, with front surface reflectors defining the tunnel walls. The light beam from the light source 310 enters the lightpipe at an entrance end and leaves from an exit end. The light beam is homogenized by multiple reflections from the front surface reflecting walls so that the light beam becomes more spatially uniform at the exit end of the lightpipe.

Figure 3A:
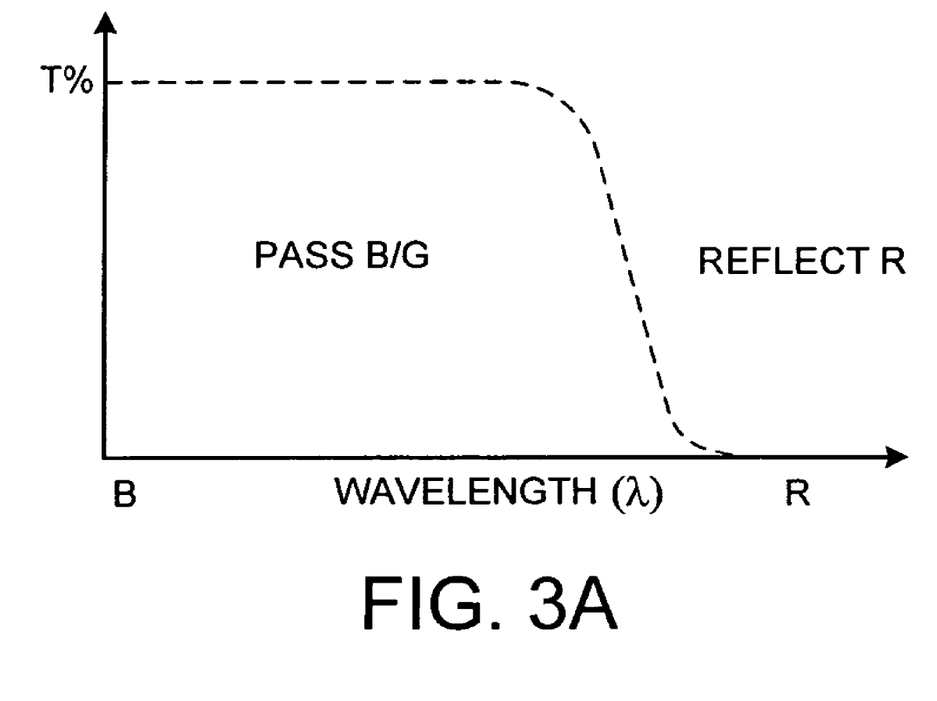
FIG. 3A shows characteristics of a dichroic beamsplitter.

The output of the homogenization system 314 is passed through to a color management system 304 that includes a dichroic beamsplitter 320, two polarizing beamsplitters 322a, 322b, a light valve assembly including light valves 324a-324d, and a dichroic cube 326. In one example, the dichroic beamsplitter 320 has the properties shown in FIG. 3A. Accordingly, the dichroic beamsplitter 320 reflects the red light beams to a first polarizing beamsplitter 322a, and transmits the blue or green light beams to a second polarizing beamsplitter 322b. The polarizing beamsplitters 322a, 322b separate the light beams received from the dichroic beamsplitter 320 into their respective p-polarized and s-polarized components.

Figure 3B:
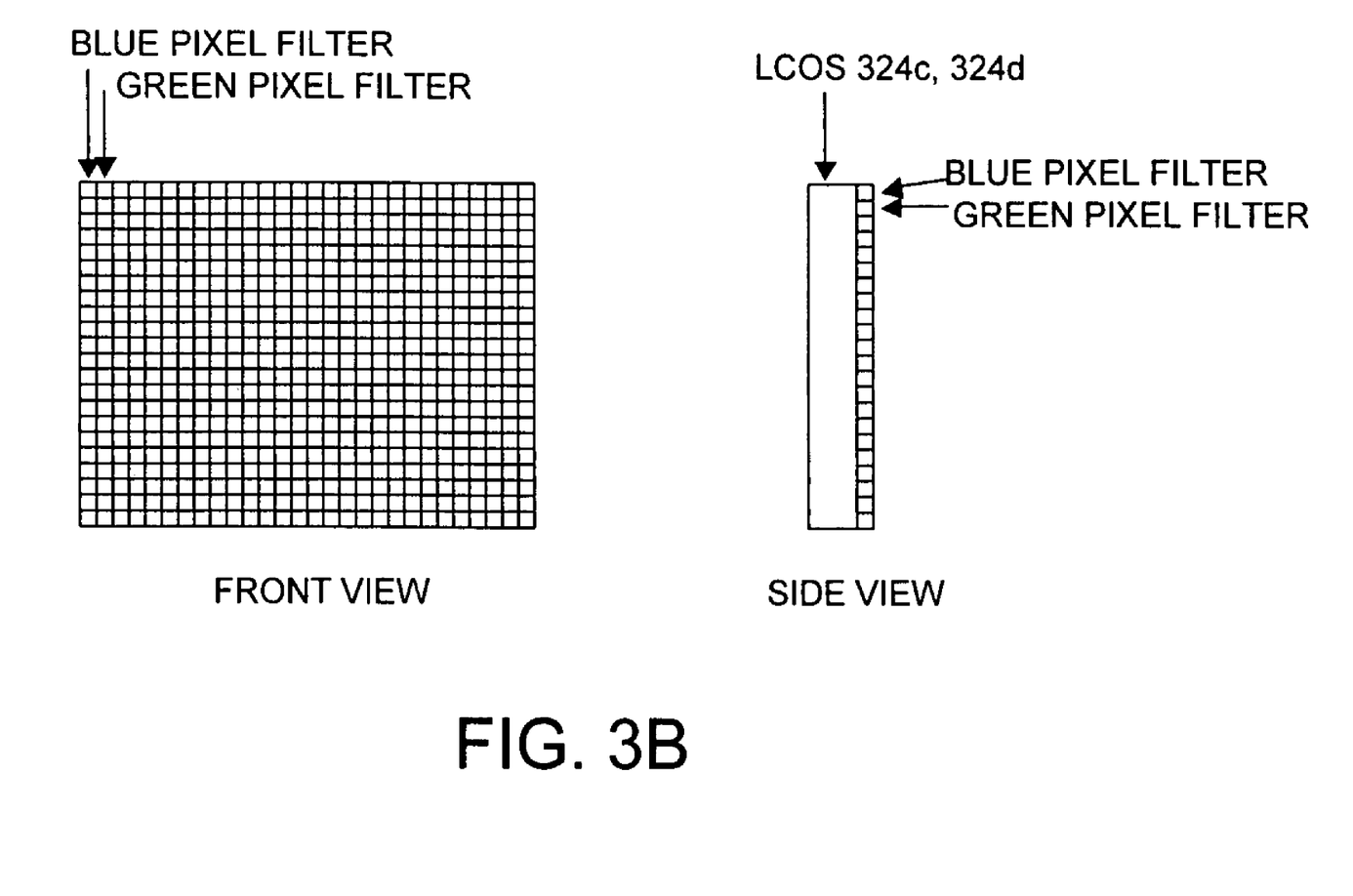
FIG. 3B shows a liquid crystal on silicon (LCOS) light valve with color pixel filters.

In the implementation illustrated in FIG. 3, two of the light valves are generic LCOS light valves ("red LCOS light valves") 324a, 324b for modulating the red light beams that strike the light valves. The other two light valves ("blue/green LCOS light valves") 324c, 324d each include a blue or green filter in front of each pixel to filter and subsequently modulate the blue and green light beams that strike the light valves as shown in FIG. 3B. The liquid crystals of the light valves are controlled fast enough to support field-sequential color operation.

The polarization of each light beam that is reflected by a LCOS light valve 324a-324d is rotated by approximately 90 degrees as previously described for pixels that are in the "on" state. The reflected light beams are transmitted to the dichroic cube 326, where the s-polarized light beams are combined to form an image polarized in the s-direction, and the p-polarized light beams are similarly combined to form an image polarized in the p-direction. The two images are then transmitted via the projection lens 306 to an image-viewing surface, such as a conventional projection screen or a polarization preserving projection screen.

Figure 4:
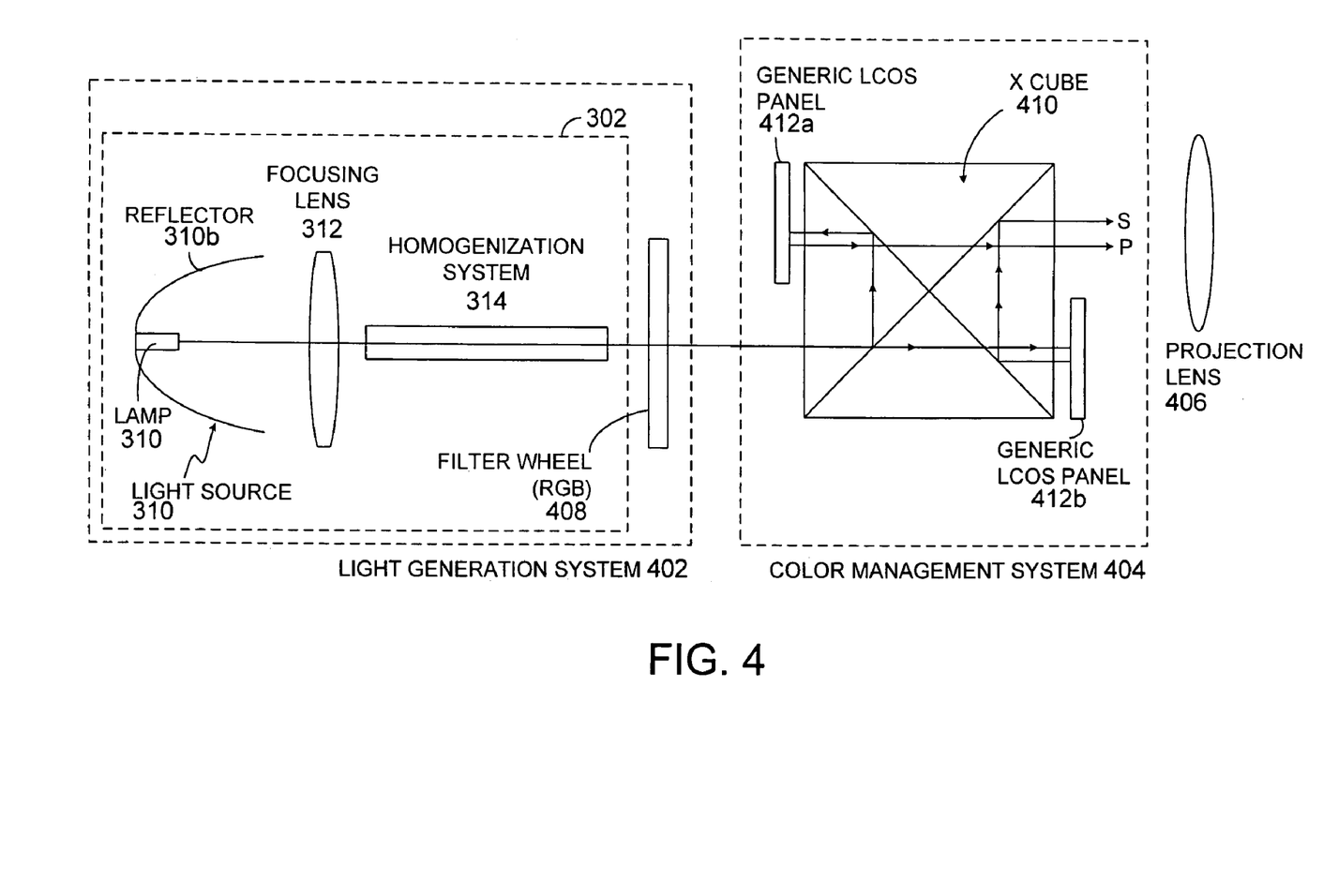
FIG. 4 shows an implementation of a light engine.

Referring to FIG. 4, in another implementation, the light engine 102 includes a light generation system 402, a color management system 404, and a projection lens 406. A rotating RGB filter wheel 408 is provided as part of the light generation system 402.

The color management system 404 includes a polarizing beamsplitter in an x-cube configuration (referred to as "x-cube" 410) and two LCOS light valves 412a, 412b. Light beams from the light generation system 402 striking the x-cube 410 include red, green, or blue components that change as the RGB filter wheel 408 rotates. The x-cube 410 separates the light beams into p-polarized components and s-polarized components, transmits the p-polarized light beams toward a first LCOS light valve 412b, and reflects the s-polarized light beams towards a second LCOS light valve 412a.

As each polarized light beam strikes a LCOS light valve 412a, 412b, liquid crystals are adjusted, in response to a video signal, to rotate the polarization of light incident on certain pixels of the light valve to generate the desired image for that color. The three colors for an image polarized in the s-direction (or the p-direction) are displayed (on a projection screen via the projection lens 406) in the time that it takes to refresh the image once (⅙₀th of a second or faster in most cases) and this is fast enough that the viewer's brain will see it as a single, full-color image. This is referred to "field sequential" color, because it presents the different color fields in sequence, rather than all at the same time. In this manner, a single light engine 102 outputs two orthogonally polarized images.

Figure 5:
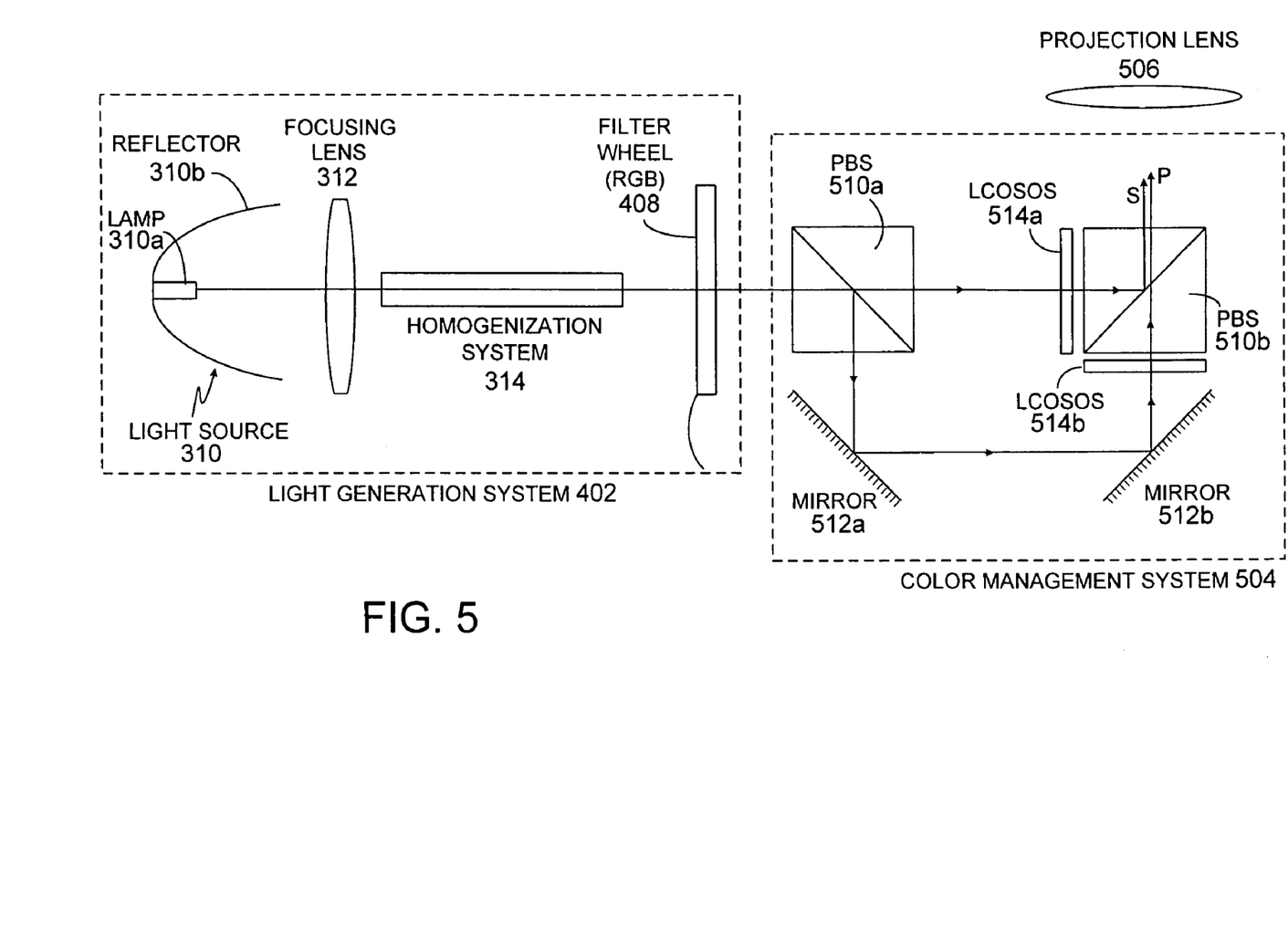
FIG. 5 shows an implementation of a light engine.

Referring to FIG. 5, in another implementation, the light engine 102 includes the light generation system 402 of FIG. 4, a color management system 504, and a projection lens 506. The color management system 504 includes two polarizing beamsplitters 510a, 510b, two mirrors 512a, 512b, and a light valve assembly formed by two liquid crystal on silicon on sapphire (LCOSOS) light valves 514a, 514b.

Light beams pass through the revolving RGB filter wheel and strike a first polarizing beamsplitter 510a, which separates the light beams into their respective p-polarized and s-polarized components. The first polarizing beamsplitter 510a transmits the p-polarized light beams through a first LCOSOS light valve 514a, and reflects the s-polarized light beams (via the two mirrors) through a second LCOSOS light valve 514b.

As each light beam strikes an LCOSOS light valve 514a, 514b, liquid crystals are adjusted in a manner similar to that described above with respect to the LCOS light valves 412a, 412b of FIG. 4, and the polarization of each light beam rotates by 90 degrees. A second polarizing beamsplitter 510b recombines the light beams that have passed through the two LCOSOS light valves 514a, 514b to form a first image in an s-polarized direction and a second image in a p-polarized direction. The two images are then transmitted via the projection lens 506 to an image-viewing surface, such as a projection screen.

Figure 6:
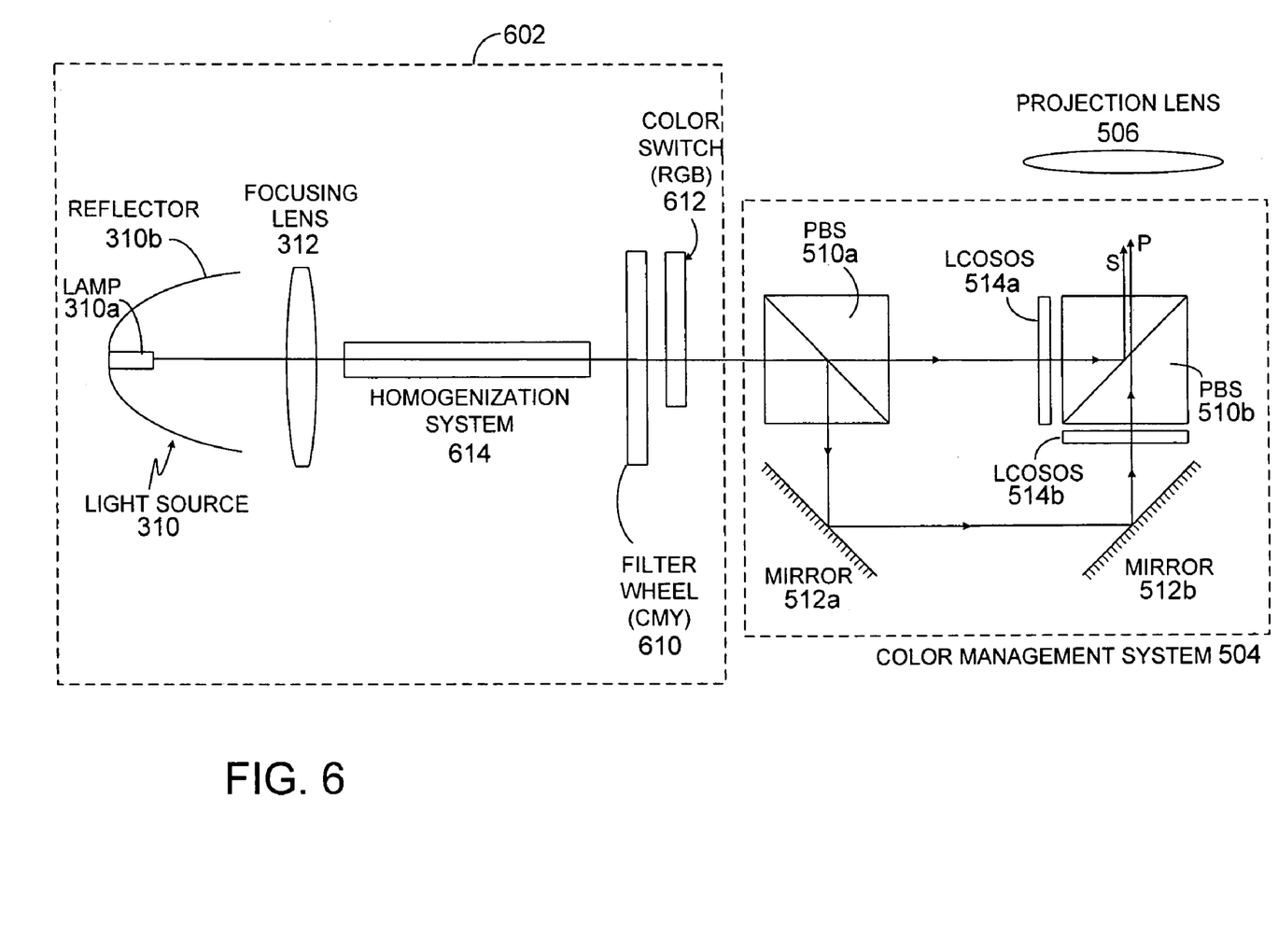
FIG. 6 shows an implementation of a light engine.

Referring to FIG. 6, in another implementation, the light engine 102 includes a light generation system 602, and the color management system 504 and projection lens 506 of FIG. 5. The light generation system 602 includes the light source 310 and the focusing lens 312 of FIG. 3, and a homogenization system 614 as well as a cyan-magenta-yellow (CMY) filter wheel 610 and a color switch 612. In the illustrated implementation, the homogenization system 614 is a polarization conversion (or recovery) lightpipe commercially available from JDS Uniphase Corporation. An RGB filter wheel, e.g., the RGB filter wheel 408 of FIG. 4, transmits light beams in three wavelength ranges that correspond to the retinal cells in the human eye. These include light beams of a long wavelength (e.g., red light having a range of 600 to 700 nm), light beams of a medium wavelength (e.g., green light having a range of 500 to 600 nm), and light beams of a short wavelength (e.g., blue light having a range of 400 to 500 nm). A CMY filter wheel, e.g., the CMY filter wheel 610 of FIG. 6, provides a higher throughput of light beams as compared to a RGB filter wheel, as the cyan portion of the CMY filter wheel 610 transmits blue and green light beams, the magenta portion of the filter transmits blue and red light beams, and the yellow portion of the filter transmits green and red light beams.

The light beams that filter through the CMY filter wheel 610 are subsequently passed to a color switch 612, which is operable under the control of a video signal to control the polarization of each light beam at any given time, so that only one color band of light (e.g., red, green or blue) is polarized with a specified linear polarization state and the other two colors are polarized with the orthogonal state. In this manner, only light beams of a particular color band are transmitted to the color management system 504 at any given time. The light beams are subsequently manipulated by the color management system 504 as described above with reference to FIG. 5.

By using a color switch 612, the duty cycle of each color can be changed to enhance system performance depending on whether the image to be projected is a 2D or 3D image. For example, with a red-deficient UHP bulb projecting a 2D image, the color accuracy of the 2D image can be improved by emphasizing light of a first set of wavelengths, e.g., by increasing the amount of time that the color switch transmits red light (at the expense of less blue light and green light). In another example, the color switch 612 is used in conjunction with a CMY color filter 610 wheel having unequal segment sizes, e.g., a relatively larger magenta or yellow segment or relatively larger magenta and yellow segments as compared to the cyan segment. For a 3D image, the polarized glasses worn by the viewer lower the apparent screen brightness, so the color switch can be adjusted to emphasize light of a second set of wavelengths, e.g., by increasing the amount of time that the color switch transmits blue light and green light (at the expense of less red light) in order to enhance the brightness of the image on the viewing surface.

Figure 7:
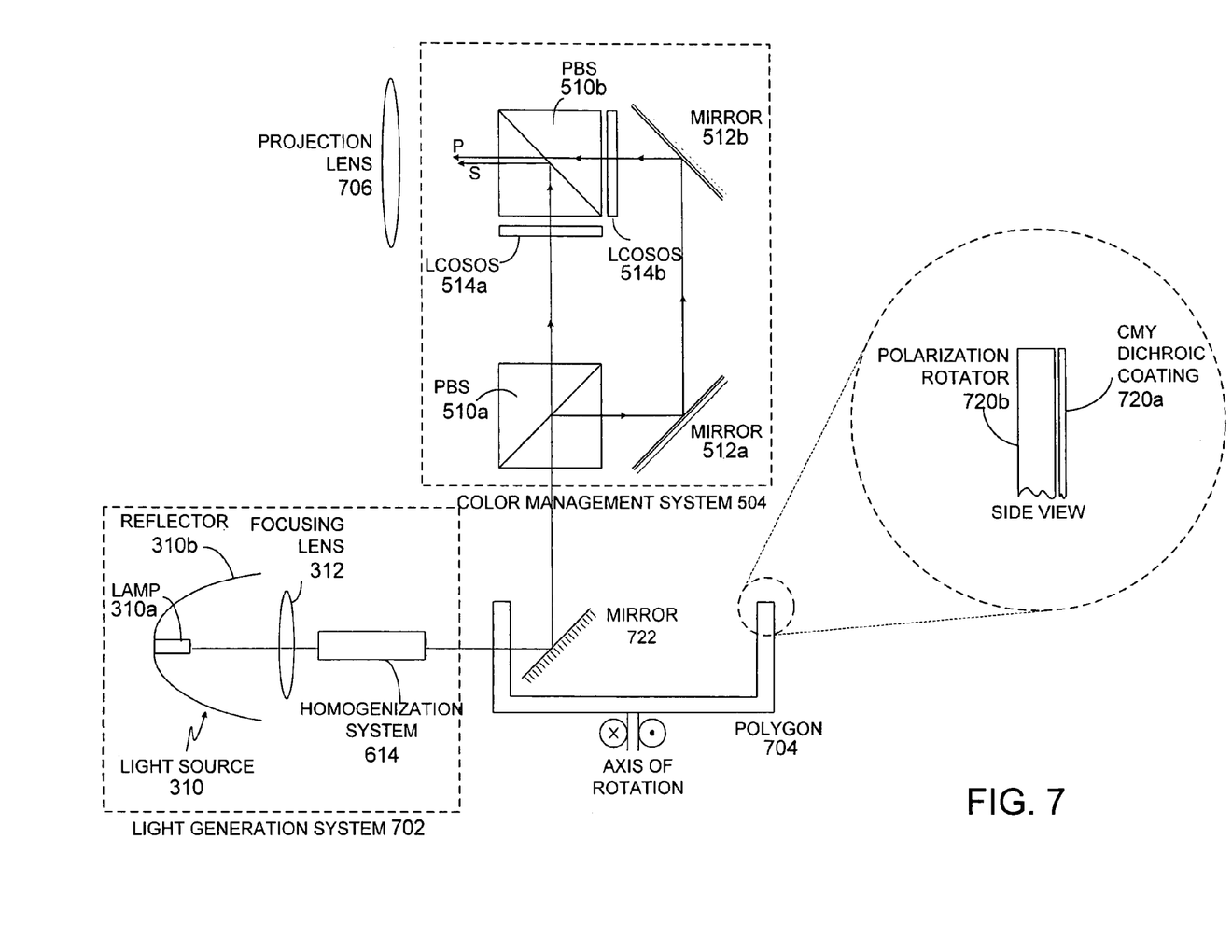
FIG. 7 shows an implementation of a light engine.

Referring to FIG. 7, in another implementation, the light engine 102 includes a light generation system 702, a polygon 704, the color management system 504 of FIG. 5, and a projection lens 706. The light generation system 702 includes the light source 310 and the focusing lens 312 of FIG. 3, and the homogenization system 614 of FIG. 6. The light beam from the light generation system 702 is focused onto a N-sided polygon 704 (e.g., a six- or twelve-sided polygon) formed by combining a CMY dichroic coating 720a to a polarization rotator 720b. In other implementations, the N-sided polygon 704 is replaced by a cylinder. The polygon 704 (or cylinder) rotates about an axis that is perpendicular to the light beam generated by the light generation source 702. When the polygon has more sides, there is less degradation from angle-of-incidence effects on the CMY dichroic coating 720a and the polarization rotator 720b, and the rotation rate of the polygon can be reduced.

The CMY dichroic coating 720a of each segment of the polygon 704 separates the light beam received from the light generation source 702 and transmits blue and green light beams, blue and red light beams, or green and red light beams, depending on the characteristics of the particular CMY dichroic coating 720a of that segment. The rotator of each segment is formed by multiple layers of birefringent materials for rotating the polarization of one color band of light beams without affecting the polarization of the other color band of light beams. In one example, a segment of the polygon 704 includes a CMY dichroic coating 720a for transmitting blue and green light beams, and a rotator for rotating the polarization of the blue light beams by 90 degrees while maintaining the polarization of the green light beams. After separation into red, green, and blue light beams, the light beams are reflected by a mirror 722 to an image-viewing surface via the color management system 504 and the projection lens 706.

A number of embodiments of the invention have been described. Nevertheless, it will be understood that various modifications may be made without departing from the spirit and scope of the invention. For example, the orthogonal polarizations exiting the light engine can be s-polarized and p-polarized as shown in FIGS. 2 through 7. More commonly, polarized glasses are made to work with −45 and +45 degree polarizations. These 45-degree polarizations give a more uniform image across the screen at a variety of common viewing angles. A single achromatic half wave retarder (AHWR) can be used at the output of the light engine to cause the s-polarized and p-polarized light beams to be rotated to −45 and +45 degree polarizations. In another example, the light valve assembly includes DMDs (digital micro-mirror devices) instead of LCOS or LCOSOS light valves. In another example, the color wheel is a disk-shaped color wheel with a number of segments, each including a dichroic filter and a rotator. Accordingly, other embodiments are within the scope of the following claims.

What is claimed is:

1. A method comprising:
   forming two polarized beams of light from an unpolarized beam of light using one of at least a two-dimensional image forming mode or a three-dimensional image forming mode, the forming including a color filtering process that is based on the image mode being used, and
   using the two polarized beams to form an image on a viewing surface.

2. The method of claim 1, wherein the forming comprises: processing the unpolarized light beam to emphasize light of a first set of wavelengths when a first image mode is being used.

3. The method of claim 2, wherein the first set of wavelengths comprise red light.

4. The method of claim 1, wherein the color filtering process increases color accuracy of the image on the viewing surface.

5. The method of claim 1, wherein the forming comprises: processing the unpolarized light beam to emphasize light of a second set of wavelengths when a second image mode is being used.

6. The method of claim 5, wherein the second set of wavelengths comprises blue light and green light.

7. The method of claim 1, wherein the color filtering process increases brightness of the image on the viewing surface.

8. An image projector comprising:
   a light processor to receive a beam of unpolarized light and form two polarized beams of light from the unpolarized beam using one of a least a two-dimensional image forming mode and the other of the image modes comprises a three-dimensional image forming mode, the light processor to form the two polarized beams using a color filtering process that is based on the image mode being used, and
   a lens to project the two polarized beams for form an image on a viewing surface.

9. The projector of claim 8, wherein the light processor comprises:
   a filtering optical element to process the unpolarized beam to emphasize light of a first set of wavelengths when a first image mode is being used.

10. The projector of claim 9, wherein the first set of wavelengths comprise red light.

11. The projector of claim 9, wherein the filtering optical element comprises a color filter wheel.

12. The projector of claim 9, wherein the filtering optical element comprises a color filter wheel and a color switch.

13. The projector of claim 12, wherein the color filter wheel comprises cyan-magenta-yellow (CMY) color wheel.

14. The projector of claim 8, wherein the light processor comprises:
   a filtering optical element to process the unpolarized beam to emphasize light of a second set of wavelengths when a second image mode is being used.

15. The projector of claim 14, wherein the second set of wavelengths comprises blue light and green light.

16. The projector of claim 14, wherein the filtering optical element comprises a color filter wheel.

17. The projector of claim 16, wherein the color filter wheel comprises a disk-shaped color wheel having a plurality of segments, each segment comprising a dichroic filter and a rotator.

18. The projector of claim 14, wherein the filtering optical element comprises a color filter wheel and a color switch.

19. The projector of claim 18, wherein the color filter wheel comprises cyan-magenta-yellow (CMY) color filter wheel.

20. The projector of claim 8, wherein the light processor comprises:
   a spectrally-selective optical element to reflect the unpolarized beam of a first set of wavelengths and to transmit the unpolarized beam of a second set of wavelengths.

21. The projector of claim 20, wherein the spectrally-selective optical element comprises a dichroic beamsplitter.

22. The projector of claim 8, wherein the light processor comprises:
   a polarization-selective optical element to separate the unpolarized beam into beams as a function of polarization.

23. The projector of claim 22, wherein the polarization-selective optical element comprises a polarizing beamsplitter.

24. The projector of claim 8, wherein the light processor comprises:
   at least one light valve to modulate a beam polarized in a first direction; and
   at least one light valve to modulate a beam polarized in a second direction.

25. The projector of claim 24, wherein each light valve modulates a polarized beam in response to a video signal.

26. The projector of claim 8, wherein the light processor comprises:
   a liquid crystal on silicon (LCOS) light valve, a liquid crystal on silicon on saphire (LCOSOS) light valve, or a digital micromirror device (DMD) light valve.

27. The projector of claim 8, wherein the light processor comprises:
   a polygon-shaped optical element comprising a polarization rotator with a dichroic coating, the polygon-shaped optical element to separate the unpolarized beam into beams as a function of wavelength and polarization.

28. The projector of claim 8, wherein the light processor comprises:
   a cylindrical-shaped optical element comprising a polarization rotator with a dichroic coating, the cylindrical-shaped optical element to separate the unpolarized beam into beams as a function of wavelength and polarization.

29. A method comprising:
   forming two orthogonally polarized beams of light from an unpolarized beam of light using a two-dimensional image forming mode or a three-dimensional image forming mode, the forming including a color filtering process that emphasizes red light when the two-dimensional image forming mode is used and emphasizes blue light and green light when the three-dimensional image forming mode is used; and
   projecting the orthogonally polarized beams to form an image on a viewing surface.

30. An image projector comprising:

a light processor to receive an unpolarized beam of light and to form two orthogonally polarized beams of light from the unpolarized beam using a two-dimensional image forming mode or a three-dimensional image forming mode, the light processor to form the two orthogonally polarized beams using a color filtering process that emphasizes red light when the two-dimensional image forming mode is used and emphasized blue light and green light when the three-dimensional image forming mode is used; and a lens to project the orthogonally polarized beams to form an image on a viewing surface.

* * * * *